US012208591B2

(12) United States Patent
Ljungberg et al.

(10) Patent No.: US 12,208,591 B2
(45) Date of Patent: Jan. 28, 2025

(54) METHOD FOR EDGE-FORMING CELLULOSE PRODUCTS IN A FORMING MOULD SYSTEM, AND A FORMING MOULD SYSTEM FOR FORMING EDGES OF CELLULOSE PRODUCTS

(71) Applicant: PULPAC AB, Västra Frölunda (SE)

(72) Inventors: Martin Ljungberg, Gothenburg (SE); Mathias Bergfjord, Gothenburg (SE)

(73) Assignee: PULPAC AB, Västra Frölunda (SE)

( * ) Notice: Subject to any disclaimer, the term of this patent is extended or adjusted under 35 U.S.C. 154(b) by 80 days.

(21) Appl. No.: 18/034,563

(22) PCT Filed: Oct. 12, 2021

(86) PCT No.: PCT/EP2021/078164
§ 371 (c)(1),
(2) Date: Apr. 28, 2023

(87) PCT Pub. No.: WO2022/089934
PCT Pub. Date: May 5, 2022

(65) Prior Publication Data
US 2024/0009950 A1 Jan. 11, 2024

(30) Foreign Application Priority Data
Nov. 2, 2020 (EP) .................................... 20205198

(51) Int. Cl.
*B31B 50/14* (2017.01)
*B31B 50/22* (2017.01)
*B31D 5/02* (2017.01)

(52) U.S. Cl.
CPC ............ *B31B 50/142* (2017.08); *B31B 50/22* (2017.08); *B31D 5/02* (2013.01)

(58) Field of Classification Search
CPC .......... B31B 50/142; B27N 5/02; B27N 3/08; B27N 3/20; D21J 1/02; D21J 1/04
(Continued)

(56) References Cited

U.S. PATENT DOCUMENTS 1,844,500 A * 2/1932 Dailey .................. B31B 50/592 493/470
2,832,522 A * 4/1958 Schlanger .......... B65D 43/0212 229/5.8
(Continued)

FOREIGN PATENT DOCUMENTS

EP 0951990 A2 10/1999

OTHER PUBLICATIONS

International Search Report and Written Opinion for Application No. PCT/EP2021/078164, dated Jan. 19, 2022.

*Primary Examiner* — Robert F Long
*Assistant Examiner* — Xavier A Madison
(74) *Attorney, Agent, or Firm* — Sage Patent Group

(57) ABSTRACT

A method and system for edge-forming cellulose products from an air-formed cellulose blank structure. The system comprises a first mould part having an edge-forming device with a protruding element configured for compacting and separating fibres of the cellulose blank structure and a second mould part arranged for cooperating with each other. The edge-forming device is movably arranged in relation to a base structure of the first mould part, and is adapted for interacting with a pressure member arranged in the base structure. The method includes the steps: providing the air-formed cellulose blank structure, and forming a compacted edge structure of the cellulose products by separating fibres of the cellulose blank structure with the protruding element, applying an edge-forming temperature, and compacting the cellulose blank structure by applying an edge-
(Continued)

forming pressure onto the cellulose blank structure between the protruding element and the second mould part.

19 Claims, 11 Drawing Sheets

(58) Field of Classification Search
USPC .......................................................... 493/340
See application file for complete search history.

(56) References Cited

U.S. PATENT DOCUMENTS

| | | | | |
|---|---|---|---|---|
| 6,527,687 | B1 | 3/2003 | Fortney et al. | |
| 6,756,105 | B1 * | 6/2004 | Haataja .................... | B27N 3/08 264/118 |
| 2011/0195829 | A1 * | 8/2011 | Treccani ............... | B31F 1/0077 493/174 |
| 2023/0321866 | A1 * | 10/2023 | Larsson ................ | B29C 51/082 264/239 |

* cited by examiner

METHOD FOR EDGE-FORMING CELLULOSE PRODUCTS IN A FORMING MOULD SYSTEM, AND A FORMING MOULD SYSTEM FOR FORMING EDGES OF CELLULOSE PRODUCTS

CROSS-REFERENCE TO RELATED APPLICATION

This application is a national phase entry under 35 USC § 371 of International Application No. PCT/EP2021/078164, filed on Oct. 12, 2021, which claims the benefit of and priority to European Patent Application No. 20205198.3, filed on Nov. 2, 2020. The entire disclosures of which are incorporated herein by reference.

TECHNICAL FIELD

The present disclosure relates to a method for edge-forming cellulose products in a forming mould system, where the forming mould system is adapted for forming the cellulose products from an air-formed cellulose blank structure. The forming mould system comprises a first mould part and a second mould part arranged for cooperating with each other. The disclosure further relates to a forming mould system for forming edges of cellulose products.

BACKGROUND

Cellulose fibres are often used as raw material for producing or manufacturing products. Products formed of cellulose fibres can be used in many different situations where there is a need for having sustainable products. A wide range of products can be produced from cellulose fibres and a few examples are disposable plates and cups, cutlery, lids, bottle caps, coffee pods, and packaging materials.

Forming moulds are commonly used when manufacturing cellulose products from raw materials including cellulose fibres, and traditionally the cellulose products have been produced with wet-forming techniques. A material commonly used for wet-forming cellulose fibre products is wet moulded pulp. Wet moulded pulp has the advantage of being considered as a sustainable packaging material, since it is produced from biomaterials and can be recycled after use. Consequently, wet moulded pulp has been quickly increasing in popularity for different applications. Wet moulded pulp articles are generally formed by immersing a suction forming mould into a liquid or semi liquid pulp suspension or slurry comprising cellulose fibres, and when suction is applied, a body of pulp is formed with the shape of the desired product by fibre deposition onto the forming mould. With all wet-forming techniques, there is a need for drying of the wet moulded product, where the drying is a very time and energy consuming part of the production. The demands on aesthetical, chemical and mechanical properties of cellulose products are increasing, and due to the properties of wet-formed cellulose products, the mechanical strength, flexibility, freedom in material thickness, and chemical properties are limited. It is also difficult in wet-forming processes to control the mechanical properties of the products with high precision.

One development in the field of producing cellulose products is the forming of cellulose fibres without using wet-forming techniques. Instead of forming the cellulose products from a liquid or semi liquid pulp suspension or slurry, an air-formed cellulose blank structure is used. The air-formed cellulose blank structure is inserted into a forming mould and during the forming of the cellulose products the cellulose blank structure is subjected to a high forming pressure and a high forming temperature, for example by using standard pressing equipment. When using this forming method, the edge structures of the formed cellulose products have a tendency to absorb moisture to a higher extent than the rest of the products, which may weaken the construction of the products. Further, if the cellulose products are built-up of different material layers, the materials may easily delaminate at the edge structures, especially if exposed to moisture. Another issue is the very small tolerance acceptance when forming edges with traditional cutting tools in the forming mould, and this is especially problematic in multi-cavity forming moulds where a plurality of products are formed in one forming step where cutting edges of the forming mould parts are overlapping each other. Such cutting processes may also result in loose cellulose fibres in the edge of the products.

There is thus a need for an improved method and system for forming cellulose products from an air-formed cellulose blank structure.

SUMMARY

An object of the present disclosure is to provide a method for edge-forming cellulose products in a forming mould system, and a forming mould system for forming edges of cellulose products, where the previously mentioned problems are avoided. This object is at least partly achieved by the features of the independent claims. The dependent claims contain further developments of the method for edge-forming cellulose products in a forming mould system, and the forming mould system for forming edges of cellulose products.

The disclosure concerns a method for edge-forming cellulose products in a forming mould system, where the forming mould system is adapted for forming the cellulose products from an air-formed cellulose blank structure. The forming mould system comprises a first mould part and a second mould part arranged for cooperating with each other. The first mould part comprises an edge-forming device with a protruding element configured for compacting and separating fibres of the cellulose blank structure. The edge-forming device is movably arranged in relation to a base structure of the first mould part, and the edge-forming device is adapted for interacting with a pressure member arranged in the base structure. The method comprises the steps: providing the air-formed cellulose blank structure, and arranging the cellulose blank structure between the first mould part and the second mould part; forming a compacted edge structure of the cellulose products by separating fibres of the cellulose blank structure with the protruding element, applying an edge-forming temperature onto the cellulose blank structure, and compacting the cellulose blank structure by applying an edge-forming pressure by means of the pressure member onto the cellulose blank structure between the protruding element and the second mould part.

Advantages with these features are that highly compressed edge sections are formed on the cellulose products, where delamination of the edge sections and loose fibres in the edge sections are prevented. Further, the formed edge sections with the highly compressed cellulose blank structure have a tendency to absorb less moisture. The forming mould system can be made simpler in construction with better tolerances through the interaction between the edge-forming device and the second mould part. With the interaction of the pressure member and the second mould part, alignment variations between the mould parts are allowed in the edge-forming operation. This is also making the construction cheaper and easier to maintain.

According to an aspect of the disclosure, the forming mould system comprises a heating unit. The method further comprises the steps: applying an edge-forming temperature level in the range of 50-300° C., preferably in the range of 100-300° C., onto the cellulose blank structure with the heating unit, and applying an edge-forming pressure level of at least 10 MPa, preferably in the range of 10-4000 MPa, or more preferably in the range of 100-4000 MPa, onto the cellulose blank structure with the pressure member. The heating unit is heating the cellulose blank structure to a desired edge-forming temperature, and the heating unit may for example be arranged in the mould parts for heating the cellulose blank structure during the forming process.

According to another aspect of the disclosure, the method further comprises the steps: applying the edge-forming temperature onto the cellulose blank structure with the protruding element and/or the second mould part. With the heat application from the protruding element and/or the second mould part to the cellulose blank structure, an efficient heat transfer to the cellulose blank structure is achieved.

According to an aspect of the disclosure, the forming mould system comprises a stopping member arranged on the first mould part and/or the second mould part. The method further comprises the step: preventing contact between the protruding element and the second mould part with the stopping member during forming of the compacted edge structure. The stopping member is preventing contact between the protruding element and the second mould part for an efficient edge-forming process. A gap is formed between the protruding element and the second mould part in an operating state of the forming mould system where the stopping member is preventing further displacement of the protruding element and the second mould part towards each other.

According to another aspect of the disclosure, the method further comprises the steps: establishing the edge-forming pressure onto the cellulose blank structure upon movement of the edge-forming device in relation to the base structure through interaction from the pressure member. Through the movement of edge-forming device, the edge-pressure exerted onto the cellulose blank structure can be efficiently controlled for an edge-forming process with high quality of the formed edges.

According to a further aspect of the disclosure, the pressure member comprises one or more springs arranged between the base structure and the edge-forming device. The one or more springs are establishing the edge-forming pressure onto the cellulose blank structure between the protruding element and the second mould part. The one or more springs are efficiently controlling the edge-forming pressure, and are suitable to use as pressure member through the interaction with the movably arranged edge-forming device. When the first mould part and second mould part are cooperating with each other during forming of the cellulose products, the one or more springs are establishing a determined edge-forming pressure exerted on the cellulose blank structure. The movable arrangement of the edge-forming device in relation to the base structure is controlling the forming pressure together with the one or more springs.

According to an aspect of the disclosure, the pressure member comprises a hydraulic pressure unit. The hydraulic pressure unit comprises a pressure chamber arranged between the base structure and the edge-forming device. The hydraulic pressure unit is establishing the edge-forming pressure onto the cellulose blank structure between the protruding element and the second mould part. The hydraulic pressure unit is suitable to use as an alternative pressure member through the interaction with the movably arranged edge-forming device. When the first mould part and second mould part are cooperating with each other during forming of the cellulose products, the hydraulic pressure unit is establishing the edge-forming pressure exerted on the cellulose blank structure. The hydraulic pressure unit is used for exerting a hydraulic pressure onto the edge-forming device for establishing a determined edge-forming pressure. When the edge-forming device through the hydraulic pressure is moved in a direction towards the second mould part, the edge-forming pressure is established in a precise and efficient way.

According to another aspect of the disclosure, the pressure member comprises one or more detent mechanisms arranged in the base structure. The one or more detent mechanisms are configured for interacting with the edge-forming device for establishing the edge-forming pressure onto the cellulose blank structure between the protruding element and the second mould part. The method further comprises the steps: exerting an applied force onto the edge-forming device by the second mould part; and releasing the one or more detent mechanisms when the applied force is equal to or greater that a predetermined release force for allowing movement of the edge-forming device in relation to the base structure. With this system configuration, the edge-forming pressure can be efficiently controlled by the pressure member and the releasing functionality of the one or more detent mechanisms is allowing the edge-forming operation to take place before the product forming operation, and by releasing the edge-forming pressure through the releasing functionality when the edge structure of the cellulose products has been formed more of the total forming mould system pressure available can be used in the following product forming operation step.

The disclosure further concerns a forming mould system for forming edges of cellulose products, where the forming mould system is adapted for forming the cellulose products from an air-formed cellulose blank structure. The forming mould system comprises a first mould part and a second mould part arranged for cooperating with each other. The first mould part comprises an edge-forming device with a protruding element configured for compacting and separating fibres of the cellulose blank structure, and the edge-forming device is movably arranged in relation to a base structure of the first mould part. The edge-forming device is adapted for interacting with a pressure member arranged in the base structure. The forming mould system is configured for forming a compacted edge structure of the cellulose products by separating fibres of the cellulose blank structure with the protruding element, applying an edge-forming temperature onto the cellulose blank structure, and compacting the cellulose blank structure by applying an edge-forming pressure by means of the pressure member onto the cellulose blank structure between the protruding element and the second mould part. With this configuration of the forming mould system, highly compressed edge sections are formed on the cellulose products, where delamination of the edge sections and loose fibres in the edge sections are prevented. Further, the formed edge sections with the highly compressed cellulose blank structure have a tendency to absorb less moisture. The forming mould system can be made simpler in construction with better tolerances through the interaction between the edge-forming device and the second mould part. This is also making the construction cheaper and easier to maintain.

According to an aspect of the disclosure, the forming mould system further comprises a heating unit. The heating unit is configured for applying an edge-forming temperature level in the range of 50-300° C., preferably in the range of 100-300° C., onto the cellulose blank structure, and the pressure member is configured for applying an edge-forming pressure level of at least 10 MPa, preferably in the range of 10-4000 MPa, or more preferably in the range of 100-4000 MPa, onto the cellulose blank structure. The heating unit is heating the cellulose blank structure to a desired edge-forming temperature, and the heating unit may for example be arranged in the mould parts for heating the cellulose blank structure during the forming process.

According to another aspect of the disclosure, the heating unit is configured for applying the edge-forming temperature onto the cellulose blank structure via the protruding element and/or the second mould part. With these configurations an efficient heat transfer to the cellulose blank structure is achieved.

According to a further aspect of the disclosure, the forming mould system comprises a stopping member arranged on the first mould part and/or the second mould part. The stopping member is configured for preventing contact between the protruding element and the second mould part during forming of the compacted edge structure, for an efficient edge-forming process. A gap is formed between the protruding element and the second mould part in an operating state of the forming mould system where the stopping member is preventing further displacement of the protruding element and the second mould part towards each other.

According to an aspect of the disclosure, the protruding element comprises an edge section facing the second mould part. The edge section together with the second mould part are configured to form a high pressure zone in the cellulose blank structure between the protruding element and the second mould part during forming of the compacted edge structure. The edge section is used for establishing the high edge-forming pressure onto the cellulose blank structure for forming a highly compacted edge structure with high finish.

According to another aspect of the disclosure, the second mould part comprises a high pressure surface facing the edge section. The high pressure surface together with the protruding element are configured to form the high pressure zone during forming of the compacted edge structure. The high-pressure surface is preventing damage to the mould part for an efficient forming of the cellulose products. The high pressure surface is suitably flat and/or flush with the adjacent surrounding surface of the second mould part.

According to an aspect of the disclosure, the forming mould system is configured for establishing the edge-forming pressure upon movement of the edge-forming device in relation to the base structure through interaction from the pressure member. Through the movement of the edge-forming device, the edge-forming pressure exerted can be efficiently controlled.

According to another aspect of the disclosure, the pressure member comprises one or more springs arranged between the base structure and the edge-forming device. The one or more springs are efficiently controlling the edge-forming pressure. The one or more springs are suitable to use as pressure member through the interaction with the movably arranged edge-forming device. When the first mould part and second mould part are cooperating with each other during forming of the cellulose products, the one or more springs are establishing a determined edge-forming pressure exerted on the cellulose blank structure. The movable arrangement of the edge-forming device in relation to the base structure is controlling the forming pressure together with the one or more springs.

According to a further aspect of the disclosure, the pressure member comprises a hydraulic pressure unit, where the hydraulic pressure unit comprises a pressure chamber arranged between the base structure and the edge-forming device. The hydraulic pressure unit is suitable to use as an alternative pressure member through the interaction with the movably arranged edge-forming device. When the first mould part and second mould part are cooperating with each other during forming of the cellulose products, the hydraulic pressure unit is establishing the edge-forming pressure exerted on the cellulose blank structure. The hydraulic pressure unit is used for exerting a hydraulic pressure onto the edge-forming device for establishing a determined edge-forming pressure. When the edge-forming device through the hydraulic pressure is moved in a direction towards the second mould part, the edge-forming pressure is established in a precise and efficient way.

According to an aspect of the disclosure, the pressure member comprises one or more detent mechanisms arranged in the base structure, where the one or more detent mechanisms are configured for interacting with the edge-forming device. The one or more detent mechanism are suitable as an alternative pressure member for efficiently controlling the edge-forming pressure.

According to another aspect of the disclosure, the base structure comprises an inner forming mould section, where the edge-forming device is extending around the inner forming mould section. With this configuration, the edge-forming device can form the edge structures of the cellulose products in a simple and efficient way.

BRIEF DESCRIPTION OF DRAWINGS

The disclosure will be described in detail in the following, with reference to the attached drawings, in which.

DESCRIPTION OF EXAMPLE EMBODIMENTS

Figure 1:
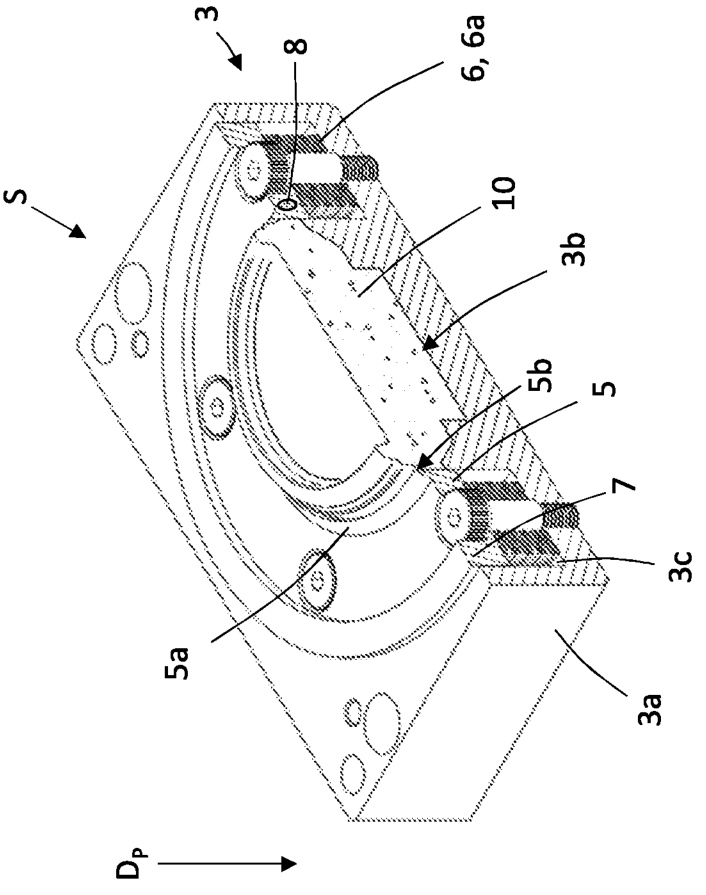
FIG. 1 shows schematically, in a perspective cross-sectional view, a first mould part with an edge-forming device of a forming mould system, according to the disclosure.

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Those skilled in the art will appreciate that the steps, services and functions explained herein at least partly may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

The disclosure concerns a method for edge-forming cellulose products 1 in a forming mould system S and a forming mould system S for forming edges of cellulose products 1. The forming mould system S is adapted for forming the cellulose products 1 from an air-formed cellulose blank structure 2. FIGS. 1 and 2*a-d*, schematically show a first exemplary embodiment of the forming mould system S. Alternative exemplary embodiments of the forming mould system S are schematically illustrated in FIGS. 4, 5, 7*a-c*, and 8*a-b*. In FIGS. 3*a-e* and 6, details of the system in different embodiments are schematically shown.

With an air-formed cellulose blank structure 2 according to the disclosure is meant a fibre web structure produced from cellulose fibres. With air-forming of the cellulose blank structure 2 is meant the formation of a cellulose blank structure in a dry-forming process in which cellulose fibres are air-formed to produce the cellulose blank structure 2. When forming the cellulose blank structure 2 in the air-forming process, the cellulose fibres are carried and formed to the fibre blank structure 2 by air as carrying medium. This is different from a normal papermaking process or a traditional wet-forming process, where water is used as carrying medium for the cellulose fibres when forming the paper or fibre structure. In the air-forming process, small amounts of water or other substances may if desired be added to the cellulose fibres in order to change the properties of the cellulose product, but air is still used as carrying medium in the forming process. The cellulose blank structure 2 may, if suitable have a dryness that is mainly corresponding to the ambient humidity in the atmosphere surrounding the air-formed cellulose blank structure 2. As an alternative, the dryness of the cellulose blank structure 2 can be controlled in order to have a suitable dryness level when forming the cellulose products 1.

The air-formed cellulose blank structure 2 may be formed of cellulose fibres in a conventional air-forming process and be configured in different ways. For example, the cellulose blank structure 2 may have a composition where the fibres are of the same origin or alternatively contain a mix of two or more types of cellulose fibres, depending on the desired properties of the cellulose products 1. The cellulose fibres used in the cellulose blank structure 2 are during the forming process of the cellulose products 1 strongly bonded to each other with hydrogen bonds. The cellulose fibres may be mixed with other substances or compounds to a certain amount as will be further described below. With cellulose fibres is meant any type of cellulose fibres, such as natural cellulose fibres or manufactured cellulose fibres. The cellulose blank structure 2 may specifically comprise at least 95% cellulose fibres, or more specifically at least 99% cellulose fibres.

The air-formed cellulose blank structure 2 may have a single-layer or a multi-layer configuration. A cellulose blank structure 2 having a single-layer configuration is referring to a cellulose blank structure that is formed of one layer containing cellulose fibres. A cellulose blank structure 2 having a multi-layer configuration is referring to a cellulose blank structure that is formed of two or more layers comprising cellulose fibres, where the layers may have the same or different compositions or configurations. The cellulose blank structure 2 may comprise a reinforcement layer comprising cellulose fibres, where the reinforcement layer is arranged as a carrying layer for other layers of the cellulose blank structure 2. The reinforcement layer may have a higher tensile strength than other layers of the cellulose blank structure 2. This is useful when one or more layers of the cellulose blank structure 2 have compositions with low tensile strength in order to avoid that the cellulose blank structure 2 will break during the forming of the cellulose products 1. The reinforcement layer with a higher tensile strength acts in this way as a supporting structure for other layers of the cellulose blank structure 2. The reinforcement layer may for example be a tissue layer containing cellulose fibres, an airlaid structure comprising cellulose fibres, or other suitable layer structures.

The air-formed cellulose blank structure 2 is a fluffy and airy structure, where the cellulose fibres forming the structure is arranged relatively loosely in relation to each other. The fluffy cellulose blank structure 2 is used for an efficient forming of the cellulose products 1, allowing the cellulose fibres to form the cellulose products 1 in an efficient way during the forming process.

As illustrated in FIGS. 1 and 2*a-d*, the multi-cavity forming mould system S comprises a first mould part 3 and a second mould part 4 arranged for cooperating with each other upon forming of the cellulose products 1, and upon edge-forming of the cellulose products 1.

The first mould part 3 and the second mould part 4 are movably arranged in relation to each other, and the first mould part 3 and the second mould part 4 are configured for moving in relation to each other in a pressing direction $D_P$. In the embodiments illustrated in FIGS. 1 and 2*a-d*, the first mould part 3 is stationary and the second mould part 4 is movably arranged in relation to the first mould part 3 in the pressing direction $D_P$. As indicated with the double arrow in FIG. 2*a*, the second mould part 4 is configured to move both towards the first mould part 3 and away from the first mould part 3 in linear movements along an axis extending in the pressing direction $D_P$. In alternative embodiments, the second mould part 4 may be stationary with the first mould part 3 movably arranged in relation to the second mould part 4, or both mould parts may be movably arranged in relation to each other.

It should be understood that for all embodiments according to the disclosure, the expression moving in the pressing direction $D_P$ includes a movement along an axis extending in the pressing direction $D_P$, and the movement may take place along the axis in opposite directions. The expression further includes both linear and non-linear movements of a mould part for all embodiments, where the result of the movement during forming is a repositioning of the mould part in the pressing direction $D_P$.

Figure 6:
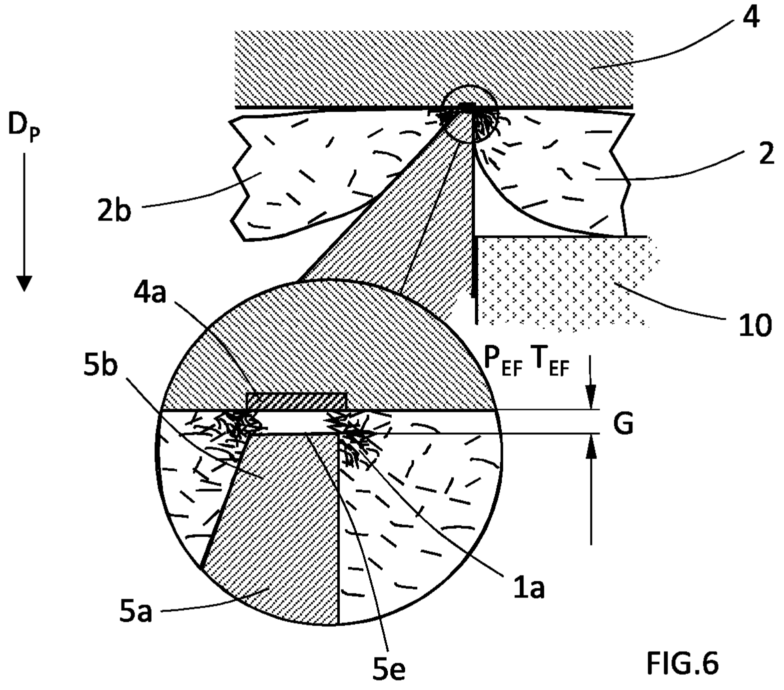
FIG. 6 shows schematically in a cross-sectional side view, the protruding element of the edge-forming device with an edge section, according to another embodiment of the disclosure.

The first mould part 3 comprises an edge-forming device 5, as schematically illustrated in FIGS. 1, 2*a-d*, 3*a-e*, and 6. The edge-forming device 5 comprises a protruding element 5*a* configured for compacting and separating fibres 2*a* of the cellulose blank structure 2. The protruding element 5*a* is arranged with an edge section 5*b* that is facing the second mould part 4. The protruding element 5*a* is suitably arranged as a continuous element extending around the edge-forming device 5, as indicated in FIG. 1, where the protruding element 5*a* has a circular extension corresponding to the edge shape or outer contour of the cellulose products 1 produced in the forming mould system S. It should however be understood that the protruding element 5*a* may have any suitable extension, such as for example non-continuous, depending on the shape of the cellulose products 1 to be formed. The protruding element 5*a* further has a pointed cross-sectional configuration with the edge section 5*b*, as shown in FIGS. 2*a-d* and 3*a-e*, or alternatively an edge section 5*b* with a flat upper surface 5*e*, as shown in FIG. 6. The protruding element 5*a* with the edge section 5*b* may in other non-illustrated embodiments have other suitable cross-sectional configurations, such as a rounded edge section 5*b*. The edge-forming device 5 is movably arranged in relation to a base structure 3*a* of the first mould part 3, as illustrated with a double arrow in FIG. 2*a*, and the edge-forming device 5 is adapted for interacting with a pressure member 6 arranged in the base structure 3*a*. The base structure 3*a* comprises an inner forming mould section 3*b*, and the edge-forming device 5 is extending around the inner forming mould section 3*b*. The inner forming mould section 3*b* is arranged for forming the cellulose products 1 through interaction with a cooperating mould section of the second mould part 4. During forming of the cellulose products 1, the cellulose blank structure 2 is suitably exerted to a product forming pressure $P_{PF}$ of at least 1 MPa, preferably in the range of 4-20 MPa, and a product forming temperature $T_{PF}$ in the range of 100° C. to 300° C. When forming the cellulose products 1 strong hydrogen bonds are formed between the cellulose fibres in the cellulose blank structure 2 arranged between the inner forming mould section 3*b* and the second mould part 4. The temperature and pressure levels are for example measured in the cellulose blank structure 2 during the forming process with suitable sensors arranged in or in connection to the cellulose fibres in the cellulose blank structure 2.

As shown in FIG. 1, the movably arranged edge-forming device 5 has in the illustrated embodiment a ring-like configuration. It should however be understood that the edge-forming device 5 may have any suitable shape and configuration, depending on the shape and configuration of the cellulose products 1. The edge-forming device 5 may for example be slidingly arranged in relation to the base structure 3*a* in the pressing direction $D_P$, and the base structure 3*a* is provided with a recess 3*c* for housing the edge-forming device 5. The recess 3*c* suitably has a shape corresponding to the shape of the edge-forming device 5. The edge-forming device 5 and the base structure 3*a* may be made of any suitable material, such as for example steel, aluminium, other metals or metallic materials, or alternatively from composite materials or a combination of different materials.

The pressure member 6 may comprise one or more springs 6*a* arranged between the base structure 3*a* and the edge-forming device 5. In the embodiment illustrated in FIGS. 1 and 2*a-d*, the pressure member 6 comprises a plurality of spaced apart springs 6*a* arranged between the base structure 3*a* and the edge-forming device 5. The plurality of spaced apart springs 6*a* are as shown arranged in the recess 3*c*. Each spring 6*a* may be arranged as a single spring or as two or more cooperating springs forming a spring unit. The spring or springs are suitably compression springs. In the embodiment illustrated in FIGS. 1 and 2*a-d*, each spring 6*a* is arranged as a stack of cooperating disc springs, and the plurality of springs 6*a* are configured for establishing the edge-forming pressure $P_{EF}$ onto the cellulose blank structure 2 during forming of the cellulose products 1. Other springs that may be used instead of the disc springs are for example helical springs or other types of washer springs.

Figure 2A:
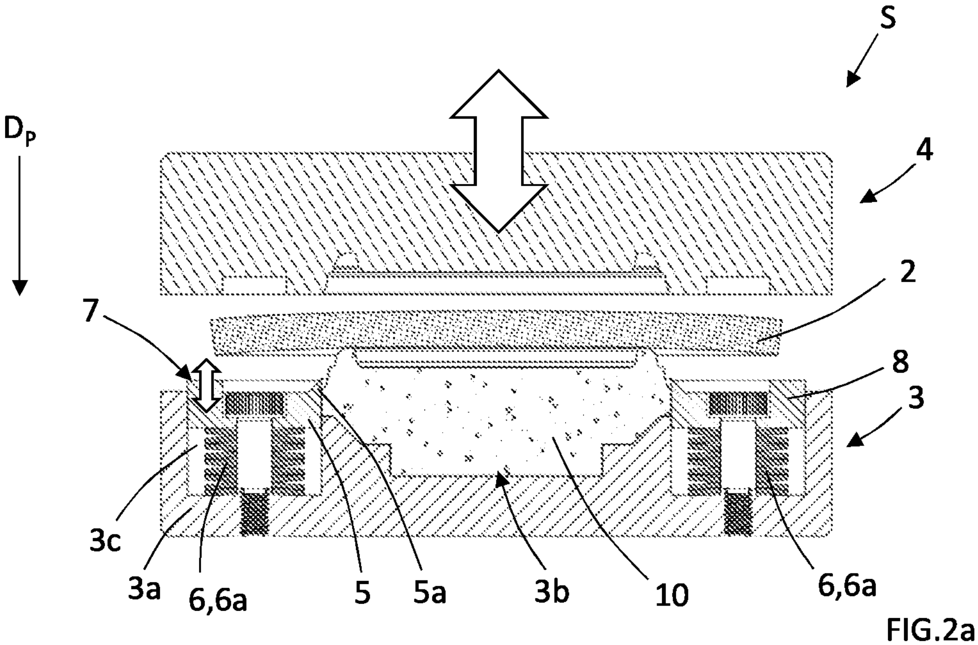
FIG. 2*a-d* show schematically in cross-sectional side views, the forming mould system with the edge-forming device, according to the disclosure.
Figure 2B:
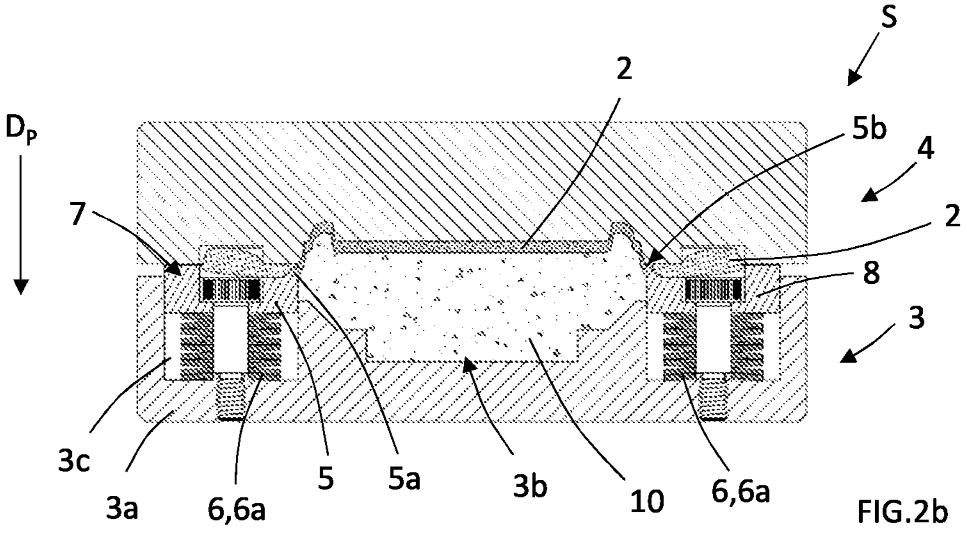
Figure 2C:
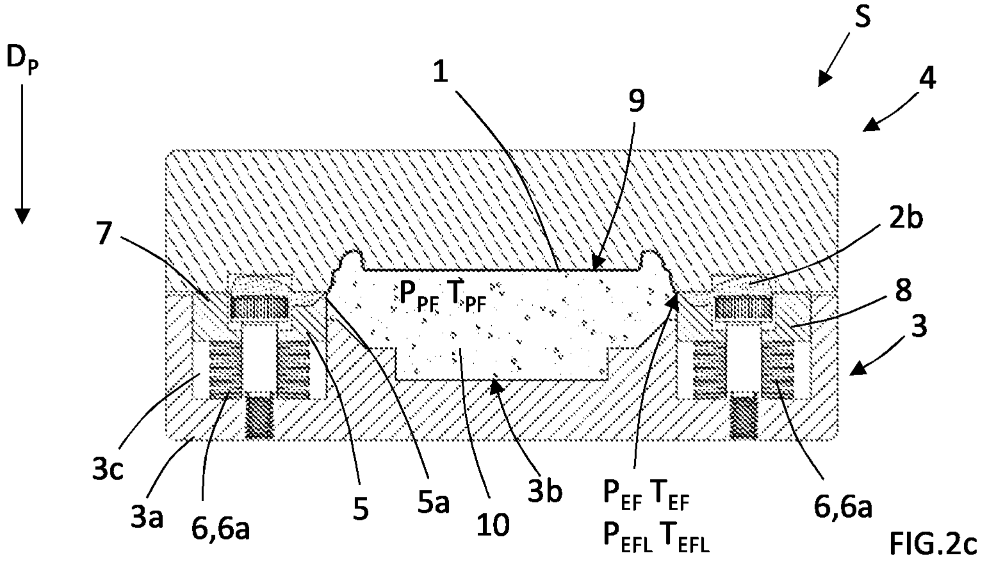

To form the cellulose products 1 from the air-formed cellulose blank structure 2 in the forming mould system S in accordance with the embodiment illustrated in FIGS. 1 and 2*a-d*, the air-formed cellulose blank structure 2 is first provided from a suitable source. The cellulose blank structure 2 may be air-formed from cellulose fibres and arranged on rolls or in stacks. The rolls or stacks may thereafter be arranged in connection to the forming mould system S. Alternatively, the cellulose blank structure may be air-formed from cellulose fibres in connection to the forming mould system S and directly fed to the mould parts. The cellulose blank structure 2 is arranged between the first mould part 3 and the second mould part 4, as shown in FIG. 2*a*. Thereafter, the second mould part 4 is moved in a direction towards the first mould part 3 in the pressing direction $D_P$ to a product forming position, as illustrated in FIG. 2*c*. A forming cavity 9 for forming the cellulose products 1 is formed between the first mould part 3 and the second mould part 4 during forming of the cellulose products 1 when the second mould part 4 is pressed towards the first mould part 3 with the cellulose blank structure 2 arranged between the mould parts. The product forming pressure $P_{PF}$ and the product forming temperature $T_{PF}$ are applied to the cellulose blank structure 2 in the forming cavity 9.

A deformation element 10 for establishing the product forming pressure may be arranged in connection to the first mould part 3 and/or the second mould part 4. In the embodiment illustrated in FIGS. 1 and 2*a-d*, the deformation element 10 is attached to the first mould part 3. By using a deformation element 10, the product forming pressure $P_{PF}$ may be an isostatic forming pressure.

For all embodiments, the first mould part 3 and/or the second mould part 4 may comprise the deformation element 10, and deformation element 10 is configured for exerting the product forming pressure $P_{PF}$ on the cellulose blank structure 2 in the forming cavity 9 during forming of the cellulose products 1. The deformation element 10 may be attached to the first mould part 3 and/or the second mould part 4 with suitable attachment means, such as for example glue or mechanical fastening members. During the forming of the cellulose products 1, the deformation element 10 is deformed to exert the product forming pressure $P_{PF}$ on the cellulose blank structure 2 in the forming cavity 9 and through deformation of the deformation element 10, an even pressure distribution is achieved even if the cellulose products 1 are having complex three-dimensional shapes or if the cellulose blank structure 2 is having a varied thickness. To exert a required product forming pressure $P_{PF}$ on the cellulose blank structure 2, the deformation element 10 is made of a material that can be deformed when a force or pressure is applied, and the deformation element 10 is suitably made of an elastic material capable of recovering size and shape after deformation. The deformation element 10 may further be made of a material with suitable properties that is withstanding the high product forming pressure $P_{PF}$ and product forming temperature $T_{PF}$ levels used when forming the cellulose products 1. Certain elastic or deformable materials have fluid-like properties when being exposed to high pressure levels. If the deformation element 10 is made of such a material, an even pressure distribution can be achieved in the forming process, where the pressure exerted on the cellulose blank structure 2 from the deformation element 10 is equal or essentially equal in all directions between the mould parts. When the deformation element 10 during pressure is in its fluid-like state, a uniform fluid-like pressure distribution is achieved. The product forming pressure $P_{PF}$ is with such a material thus applied to the cellulose blank structure 2 from all directions, and the deformation element 10 is in this way during the forming of the cellulose products 1 exerting an isostatic forming pressure on the cellulose blank structure 2. The deformation element 10 may be made of a suitable structure of elastomeric material or materials, and as an example, the deformation element 10 may be made of a massive structure or an essentially massive structure of silicone rubber, polyurethane, polychloroprene, or rubber with a hardness in the range 20-90 Shore A. Other materials for the deformation element 10 may for example be suitable gel materials, liquid crystal elastomers, and MR fluids.

Figure 2D:
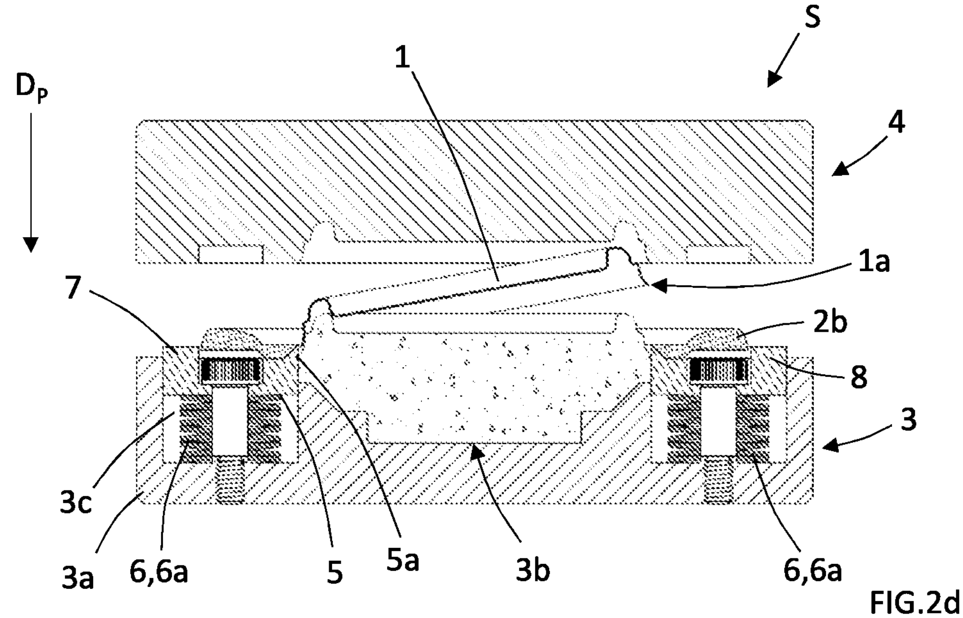
Figure 3A:
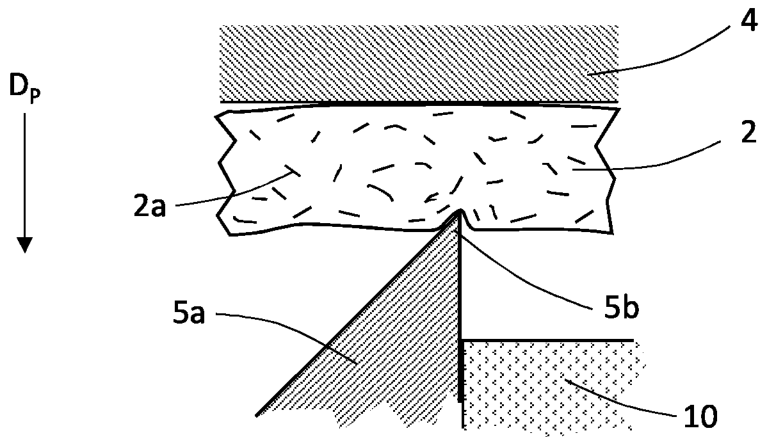
FIG. 3*a-e* show schematically in cross-sectional side views, a protruding element of the edge-forming device in different edge-forming positions, according to embodiments of the disclosure.
Figure 3B:
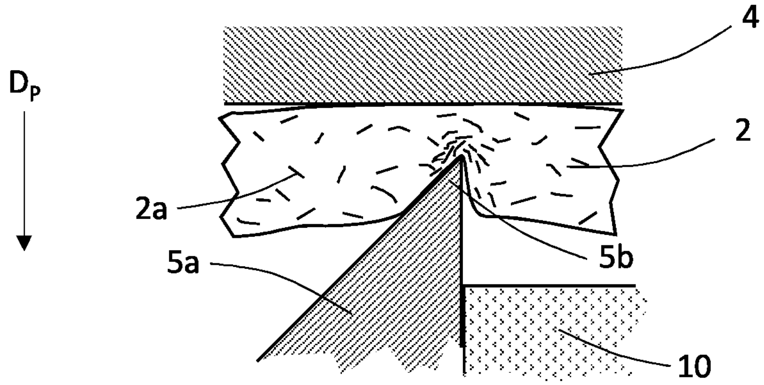
Figure 3C:
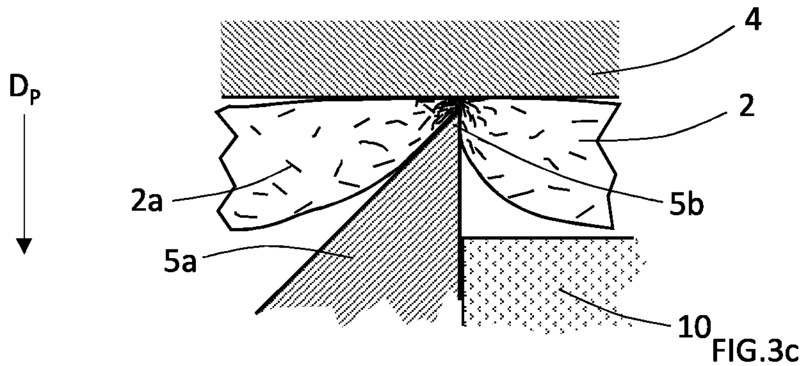
Figure 3D:
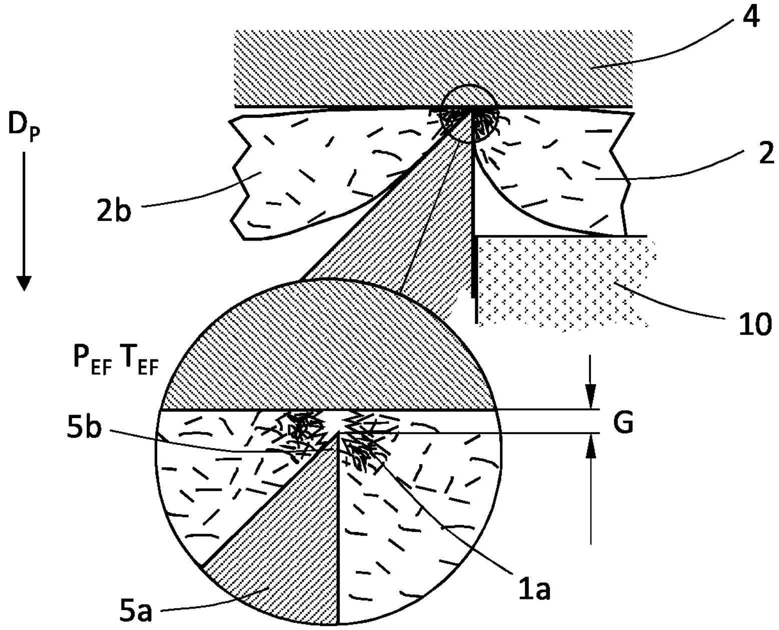

When the first mould part 3 and the second mould part 4 are arranged in connection to each other, as shown in FIG. 2*b*, the cellulose blank structure 2 is being compressed between the first mould part 3 and the second mould part 4. At the same time, the forming of a compacted edge structure 1*a* of the cellulose products 1 is established by the edge-forming device 5. During the movement of the second mould part 4 towards the first mould part 3, the protruding element 5*a* of the edge-forming device 5 is separating some of the fibres 2*a* of the cellulose blank structure 2 by forces applied to the cellulose blank structure 2 by the protruding element 5*a*, which separation of fibres is illustrated more in detail in FIGS. 3*a-b*. When the second mould part 4 is reaching the first mould part 3, as shown in FIG. 2*b*, a stopping member 7 arranged on the first mould part 3 is preventing direct contact between the protruding element 5*a* and the second mould part 4 during forming of the compacted edge structure 1*a*, as shown in FIGS. 3*c-d*. In the embodiment illustrated in FIGS. 1 and 2*a-d* the stopping member 7 is arranged as a protrusion on the edge-forming device 5, with an extension in the pressing direction $D_P$ that is greater than the extension of the protruding element 5*a*. When the second mould part 4 is reaching the first mould part 3, the stopping member 7 is coming into contact with the second mould part 4, as shown in FIG. 2*b*, and through the greater extension in the pressing direction $D_P$, direct contact between the protruding element 5*a* and the second mould part 4 is prevented. The stopping member 7 may be arranged as a continuous element extending around the edge-forming device 5, as indicated in FIG. 1, or alternatively as one or more protrusions extending from the edge-forming device 5. The stopping member 7 may instead be arranged on the second mould part 4, or both on the first mould part 3 and the second mould part 4.

Figure 3E:
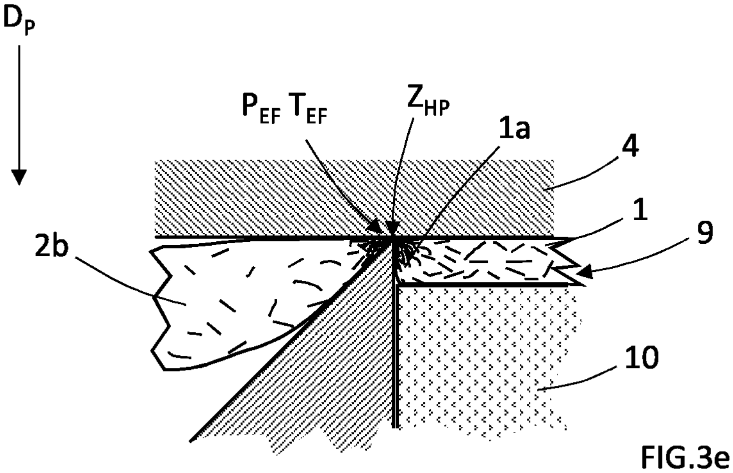

The stopping member 7 is thus preventing contact between the protruding element 5*a* and the second mould part 4 during forming of the compacted edge structure 1*a*, and with this arrangement, the protruding element 5*a* is arranged at a small distance from the second mould part 4, as shown in FIGS. 3*c-d*. As illustrated in FIGS. 3*d* and 6, a small gap G is formed between the protruding element 5*a* and the second mould part 4. The gap G is thus formed between the protruding element 5*a* and the second mould part 4 in an operating state of the forming mould system S where the stopping member 7 is preventing further displacement of the protruding element 5*a* and the second mould part 4 towards each other. During further movement of the second mould part 4 towards the first mould part 3, the edge-forming device 5 is pushed into the recess 3*c* to the product forming position shown in FIG. 2*c*, where the product forming pressure $P_{PF}$ is established in the forming cavity 9 onto the cellulose blank structure 2. When the edge-forming device 5 is pushed into the recess 3*c*, the edge structure 1*a* of the cellulose products 1 is formed. When forming the edge structure 1*a*, fibres 2*a* of the cellulose blank structure 2 are gathered in the area between the protruding element 5*a* and the second mould part 4, as shown in FIGS. 3*d-e* and 6. At the same time, an edge-forming temperature $T_{EF}$ is applied onto the cellulose blank structure 2, and an edge-forming pressure $P_{EF}$ is applied onto the cellulose blank structure 2 by means of the pressure member 6 between the protruding element 5*a* and the second mould part 4, as indicated in FIGS. 3*d-e* and 6. When the edge-forming temperature $T_{EF}$ and the edge-forming pressure $P_{EF}$ are applied to the cellulose blank structure 2, a highly compacted edge structure 1*a* is formed.

The pressure member 6 is during forming of the edge-structure 1*a* arranged to establish the edge-forming pressure $P_{EF}$. When the second mould part 4 is coming into contact with the stopping member 7, as shown in FIG. 2*b*, the edge-forming device 5 is upon further movement of the second mould part 4 towards the first mould part 3 pushed in the pressing direction into the recess 3*c* of the base structure 3*a* of the first mould part 3. When the edge-forming device 5 is pushed into the base structure 3*b*, the springs 6*a* are compressed, and through the compression, the edge-forming pressure $P_{EF}$ is exerted onto the cellulose blank structure 2 between the protruding element 5*a* and the second mould part 4. Thus, the forming mould system S is configured for establishing the edge-forming pressure $P_{EF}$ upon movement of the edge-forming device 5 in relation to the base structure 3*a* through interaction from the pressure member 6. A suitable control unit may be used for determining the movement of the first mould part 3 in relation to the second mould part 4 for controlling the product forming pressure $P_{PF}$, and the characteristics of the springs 6*a* are determining the edge-forming pressure $P_{EF}$.

The edge-forming pressure $P_{EF}$ is established by the pressure member 6, as described above, and a suitable edge-forming pressure level $P_{EFL}$ applied onto the cellulose blank structure 2 is of at least 10 MPa, preferably in the range of 10-4000 MPa, or more preferably in the range of 100-4000 MPa. The springs 6*a* of the pressure member 6 are thus designed and configured for applying the edge-forming pressure level $P_{EFL}$ of at least 10 MPa, preferably in the range of 10-4000 MPa, or more preferably in the range of 100-4000 MPa, onto the cellulose blank structure 2. Edge-forming tests have shown that with the temperature range described below, the edge-forming pressure level $P_{EFL}$ applied onto the cellulose blank structure 2 suitably is above 10 MPa for achieving desired results. The tests further disclosed that edge-forming pressure levels $P_{EFL}$ above 100 MPa resulted in faster edge forming operations with high quality on the edge structures 1*a* of the cellulose products 1. Tests were conducted with edge-forming pressure levels $P_{EFL}$ up to 4000 MPa resulting in edge forming operations with high quality on the edge structures 1*a*. It should however be understood that even higher pressure levels may be used.

The forming mould system S further comprises a heating unit 8 that is applying the edge-forming temperature $T_{EF}$ onto the cellulose blanks structure 2. The heating unit 8 is configured for applying an edge-forming temperature level $T_{EFL}$ in the range of 50-300° C., preferably in the range of 100-300° C., onto the cellulose blank structure 2 when forming the edge-structure 1*a*. Edge-forming tests have shown that with the pressure ranges described above, the edge-forming temperature level $T_{EFL}$ applied onto the cellulose blank structure 2 suitably is above 50° C. The tests further disclosed that with edge-forming temperature levels $T_{EFL}$ above 100° C. resulted in faster edge forming operations with high quality on the edge structures 1*a* of the cellulose products 1. Tests were conducted with edge-forming temperature levels $T_{EFL}$ up to 300° C. resulting in edge forming operations with high quality on the edge structures 1*a*. The heating unit 8 is suitably configured for applying the edge-forming temperature $T_{EF}$ onto the cellulose blank structure 2 via the protruding element 5*a* and/or the second mould part 4. The heating unit 8 may have any suitable configuration. A suitable heating unit, such as a heated forming mould part or heated forming mould parts may be used for establishing the edge-forming temperature $T_{EF}$. The heating unit 8 may be integrated in or cast into the first mould part 3 and/or the second mould part 4, and suitable heating devices are e.g. electrical heaters, such as a resistor element, or fluid heaters. Other suitable heat sources may also be used.

The edge-forming temperature and pressure levels are for example measured in the cellulose blank structure 2 during the forming process with suitable sensors arranged in or in connection to the cellulose fibres in the cellulose blank structure 2.

The heating unit 8 may also be used for establishing the product forming temperature $T_{PF}$ in the forming cavity 9. In the embodiment illustrated in FIGS. 1 and 2*a-d*, the heating device 8 is suitably integrated in the edge-forming device 5.

As shown more in detail in FIGS. 3*a-e* and 6, the protruding element 5*a* comprises the edge section 5*b* facing the second mould part 4, as described above. The edge section 5*b* together with the second mould part 4 are configured to form a high pressure zone $Z_{HP}$ in the cellulose blank structure 2 between the protruding element 5*a* and the second mould part 4 during forming of the compacted edge structure 1*a*. In the high pressure zone $Z_{HP}$, the edge-forming pressure level $P_{EFL}$ of at least 10 MPa, preferably in the range of 10-4000 MPa, or more preferably in the range of 100-4000 MPa, as described above, is applied onto the cellulose blank structure 2. This edge-forming pressure level $P_{EFL}$ together with the edge-forming temperature level $T_{EFL}$ in the range of 50-300° C., preferably in the range of 100-300° C., is highly impacting the cellulose fibres 2*a* in the cellulose blank structure 2. The cellulose fibres are strongly bonded to each other with hydrogen bonds for forming a highly compacted edge structure 1*a* of the cellulose products 1. The edge structure 1*a* is suitable formed as a thin edge section extending around the periphery of the cellulose products 1, and the highly compacted formed edge structure 1*a* is efficiently preventing delamination of and moisture absorption into the cellulose products 1. With the high edge-forming pressure $P_{EF}$ applied onto the cellulose blank structure 2 together with the small distance between the edge section 5*b* and the second mould part 4, the cellulose fibres 2*a* in the high pressure zone $Z_{HP}$ are forming a very thin compacted cellulose structure that could be used for an easy separation of the formed cellulose product 1 and residual fibres 2*b* outside the forming mould parts. The thin highly compacted cellulose structure in the high pressure zone $Z_{HP}$ is exposed to high compressive stresses, and during the edge-forming process the cellulose fibres 2*a* in the high pressure zone $Z_{HP}$ fracture due to the stored energy, high tension, and/or tensile stress, in the cellulose structure when the high pressure level is applied onto the cellulose fibres 2*a* with the edge-forming pressure $P_{EF}$. The residual fibres 2*b* remaining after the forming of the cellulose products 1 may be reused.

The second mould part 4 may in all embodiments be arranged with a high pressure surface 4*a* that is facing the edge section 5*b*, as schematically shown in FIG. 6. The high pressure surface 4*a* is suitable integrated in the second mould part 4 and made of a material capable of withstanding high pressure levels, such as for example cupper, brass, or lead alloys. The high pressure surface 4*a* together with the protruding element 5*a* are configured to form the high pressure zone $Z_{HP}$ during forming of the compacted edge structure 1*a*. The high pressure surface 4*a* suitably has a shape that is corresponding to the shape of the edge section 5*b*. The high pressure surface 4*a* is suitably flat and/or flush with the adjacent surrounding surface of the second mould part 4.

As described above, a suitable edge-forming pressure level $P_{EFL}$ is at least 10 MPa, preferably in the range of 10-4000 MPa, or more preferably in the range of 100-4000 MPa, and the edge-forming pressure $P_{EF}$ is established through interaction from the pressure member 6. The one or more springs 6*a* are establishing the edge-forming pressure $P_{EF}$ onto the cellulose blank structure 2 between the protruding element 5*a* and the second mould part 4. The edge-forming pressure $P_{EF}$ is established through movement of the edge-forming device 5 in relation to the base structure 3*a* through interaction from the pressure member 6. Once the cellulose products have been formed in the multi-cavity forming mould system S, the second mould part 4 is moved in a direction away from the second mould part 4, as shown in FIG. 2*d*, and the cellulose products 1 can be removed from the forming mould system S, for example by using ejector rods or similar devices.

Figure 4:
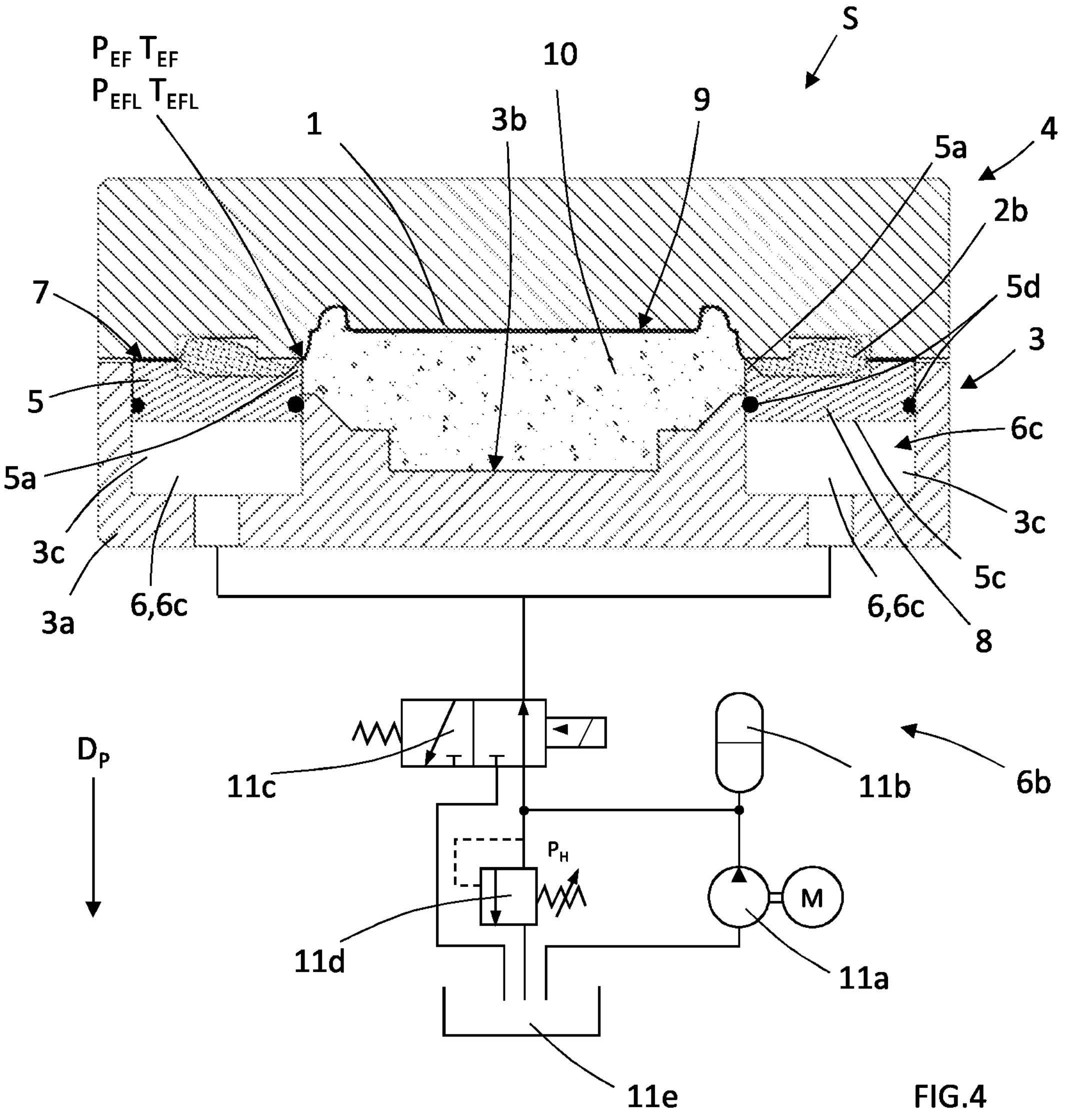
FIG. 4 shows schematically in a cross-sectional side view, the forming mould system with the edge-forming device, according to another embodiment of the disclosure.

In an alternative embodiment illustrated in FIG. 4, the pressure member 6 instead comprises a hydraulic pressure unit 6*b*. The hydraulic pressure unit 6*b* comprises a pressure chamber 6*c* delimited by the recess 3*c* of the base structure 3*a* and the edge-forming device 5. The edge-forming device 5 is configured with a protruding element 5*a* comprising an edge section 5*b*, and has suitably a function and design as described in the embodiment above in connection to FIGS. 2*a-d*. In the embodiment illustrated in FIG. 4, the pressure chamber 6*c* has a ring-like configuration corresponding to the shape of the edge-forming device 5. In this way, the edge-forming device 5 is configured as a hydraulic piston, or double-acting hydraulic piston, within the pressure chamber 6*c*. By filling the pressure chamber 6*c* with a suitable pressure medium, such as for example hydraulic oil, the edge-forming pressure $P_{EF}$ can be exerted onto the cellulose blank structure 2 via the edge-forming device 5. It should be understood that the pressure chamber 6*c* and the edge-forming device 5 may have any suitable corresponding shapes, depending on the edge-shape of the cellulose products 1.

The pressure chamber 6*c* is connected to a hydraulic pump system, a hydraulic cylinder, a spring loaded hydraulic cylinder, or other similar system or device, which via channels arranged in the base structure 3*a* are generating the pressure exerted onto the edge-forming device 5 with the pressure medium. In the embodiment shown in FIG. 4, a hydraulic pump 11*a* may be connected to the pressure chambers 6*c*, for establishing a hydraulic pressure in the system. The pressure medium is exerting the pressure onto a lower surface 5*c* of the edge-forming device 5, and the lower surface 5*c* is arranged in connection to the pressure chamber 6*c*. The edge-forming device 5 may comprise sealing elements 5*d*, which are forming a tight seal between the pressure chamber 6*c* and the edge-forming device 5. The hydraulic pump 11*a* is for example driven by an electric motor and connected to the pressure chamber 6*c* via a pressure valve 11*c* for turning the hydraulic pressure on and off. A pressure control valve 11*d* may be used for regulating the pressure level. The pressure medium may be stored in a tank 11*e* and expanded into an accumulator tank 11*b*. Pressure medium flowing out from the pressure chamber 6*c* and from the pressure control valve 11*d* may be returned to the tank 11*e*, as understood from FIG. 4. The components of the hydraulic pump system are connected with suitable conduits.

Moreover, further embodiments of the pressure member 6 may instead of the hydraulic pressure unit comprise a pneumatic cylinder or a gas spring.

To form the cellulose products 1 from the air-formed cellulose blank structure 2 in the forming mould system S in accordance with the embodiment illustrated in FIG. 4, the air-formed cellulose blank structure 2 is first provided from a suitable source. The cellulose blank structure 2 may be air-formed from cellulose fibres and arranged on rolls or in stacks. The rolls or stacks may thereafter be arranged in connection to the multi-cavity forming mould system S. Alternatively, the cellulose blank structure may be air-formed from cellulose fibres in connection to the multi-cavity forming mould system S and directly fed to the mould parts. The cellulose blank structure 2 is arranged between the first mould part 3 and the second mould part 4, as shown in FIG. 4.

Thereafter, the first mould part 3 and the second mould part 4 are moved in a direction towards each other, and in the embodiment illustrated in FIG. 4, the second mould part 4 is moved towards the first mould part 3 in a similar way as described in connection to FIGS. 2*a-d*. During the movement of the second mould part 4 towards the first mould part 3, the protruding element 5*a* of the edge-forming device 5 is separating some of the fibres 2*a* of the cellulose blank structure 2 by forces applied to the cellulose blank structure 2 by the protruding element 5*a*, as shown in FIGS. 3*a-b*. When the second mould part 4 is reaching the first mould part 3, a stopping member 7 arranged on the first mould part 3 is preventing direct contact between the protruding element 5*a* and the second mould part 4 during forming of the compacted edge structure 1*a*. The stopping member 7 is suitably arranged as a protrusion on the edge-forming device 5, with an extension in the pressing direction $D_P$ that is greater than the extension of the protruding element 5*a*, in a similar way as described in the embodiment above in connection to FIGS. 2*a-d*. When the second mould part 4 is reaching the first mould part 3, the stopping member 7 is coming into contact with the second mould part 4 and through the greater extension in the pressing direction $D_P$ contact between the protruding element 5*a* and the second mould part 4 is prevented. The stopping member 7 may be arranged as a continuous element extending around the edge-forming device 5, or alternatively as one or more protrusions extending from the edge-forming device 5. The stopping member 7 may instead be arranged on the second mould part 4, or both on the first mould part 3 and the second mould part 4.

When the edge-forming device 5 and the second mould part 4 are arranged in connection to each other, as shown in FIG. 4, a hydraulic pressure is established in the pressure chamber 6*c* by the pressure medium for exerting the edge-forming pressure $P_{EF}$ onto the cellulose blank structure 2 with the edge-forming device 5. By means of the established hydraulic pressure, the edge-forming device 5 is moved in a direction towards the second mould part 4 through the hydraulic pressure established. As described above, a suitable edge-forming pressure level $P_{EFL}$ exerted on the cellulose blank structure 2 is at least 10 MPa, preferably in the range of 10-4000 MPa, or more preferably in the range of 100-4000 MPa. When the pressure medium is flowing into the pressure chamber 6*c*, the edge-forming device 5 is pushed in a direction towards the second mould part 4 for exerting the edge-forming pressure $P_{EF}$ onto the cellulose blank structure 2 arranged between the protruding element 5*a* and the second mould part 4. The edge-forming pressure $P_{EF}$ is thus established through movement of edge-forming device 5 in relation to the base structure 3*a* through interaction from the pressure member 6. A suitable control unit may be used for controlling the hydraulic pressure exerted onto edge-forming device 5 by the pressure medium. During the forming of the edge structure 1*a* of the cellulose products 1, the cellulose blank structure 2 is heated to an edge-forming temperature level $T_{EFL}$ in the range of 50-300° C., preferably in the range of 100-300° C. The edge-forming operation may take place simultaneously with the product forming operation, or alternatively before or after the product forming operation.

Once the edge structures 1*a* and the cellulose products 1 have been formed in the forming mould system S, the second mould part 4 is moved in a direction away from the first mould part 3. A spring, a cylinder, such as a double-acting cylinder, or similar device may be used in connection to the edge-forming device 5 for returning the edge-forming device 5 to an initial position after releasing the hydraulic pressure.

The forming mould system S in the embodiment shown in FIG. 4 may further comprise a heating unit 8, in the same way as described in the embodiment above in connection to FIGS. 2*a-d*, where an edge-forming temperature level $T_{EFL}$ in the range of 50-300° C., preferably in the range of 100-300° C., is applied onto the cellulose blank structure 2 with the heating unit 8. The edge-forming temperature $T_{EF}$ is suitably applied onto the cellulose blank structure 2 with the protruding element 5*a* and/or the second mould part 4. The edge-forming pressure $P_{EF}$ is as described above applied onto the cellulose blank structure 2 upon movement of the edge-forming device 5 in relation to the base structure 3*a* through interaction from the pressure member 6. The pressure member 6 comprises the hydraulic pressure unit 6*b*, and the hydraulic pressure unit 6*b* is establishing the edge-forming pressure $P_{EF}$ onto the cellulose blank structure 2 between the protruding element 5*a* and the second mould part 4.

In an alternative non-illustrated embodiment, the forming mould system S may be arranged without the stopping member 7. The protruding element 5*a* may be configured as described in the different embodiments above with the same function. The compacted edge structure 1*a* is formed in the same way as described above through the separation of fibres 2*a* of the cellulose blank structure 2 between the protruding element 5*a* and the second mould part 4, and the compacting of the cellulose blank structure 2 by applying the edge-forming pressure $P_{EF}$ by means of the pressure member 6 onto the cellulose blank structure 2 between the protruding element 5*a* and the second mould part 4. The edge-forming temperature $T_{EF}$ is applied onto the cellulose blank structure 2 during the edge-forming process.

Figure 5:
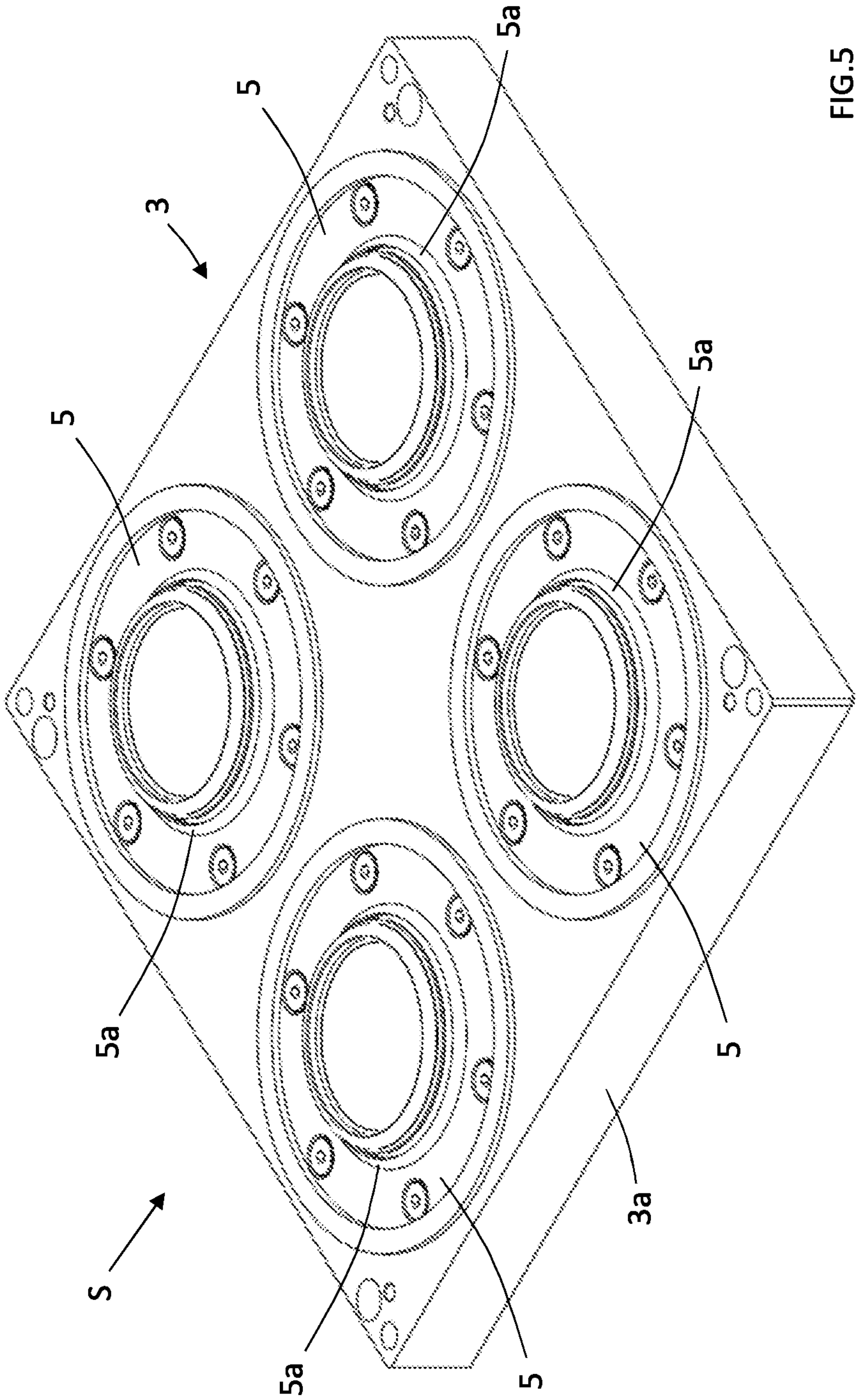
FIG. 5 shows schematically, in a perspective view, edge-forming devices in a first mould part of a forming mould system having a multi cavity configuration according to another embodiment of the disclosure.

The edge-forming device 5 is further suitable to use in a multi-cavity forming mould system S, with two or more forming moulds integrated in one mould unit. In FIG. 5, a first mould part 3 of a multi-cavity forming mould system S with four forming moulds is schematically illustrated. As shown in FIG. 5, the first mould part comprises four edge-forming devices 5 with protruding elements 5*a* arranged in a common base structure 3*a* of the first mould part 3, and the edge-forming devices 5 may have the same configuration and function as described in the embodiments above. With the multi-cavity forming mould system S illustrated in FIG. 5, four cellulose products can be formed in one single pressing step for an efficient production of cellulose products.

Figure 7A:
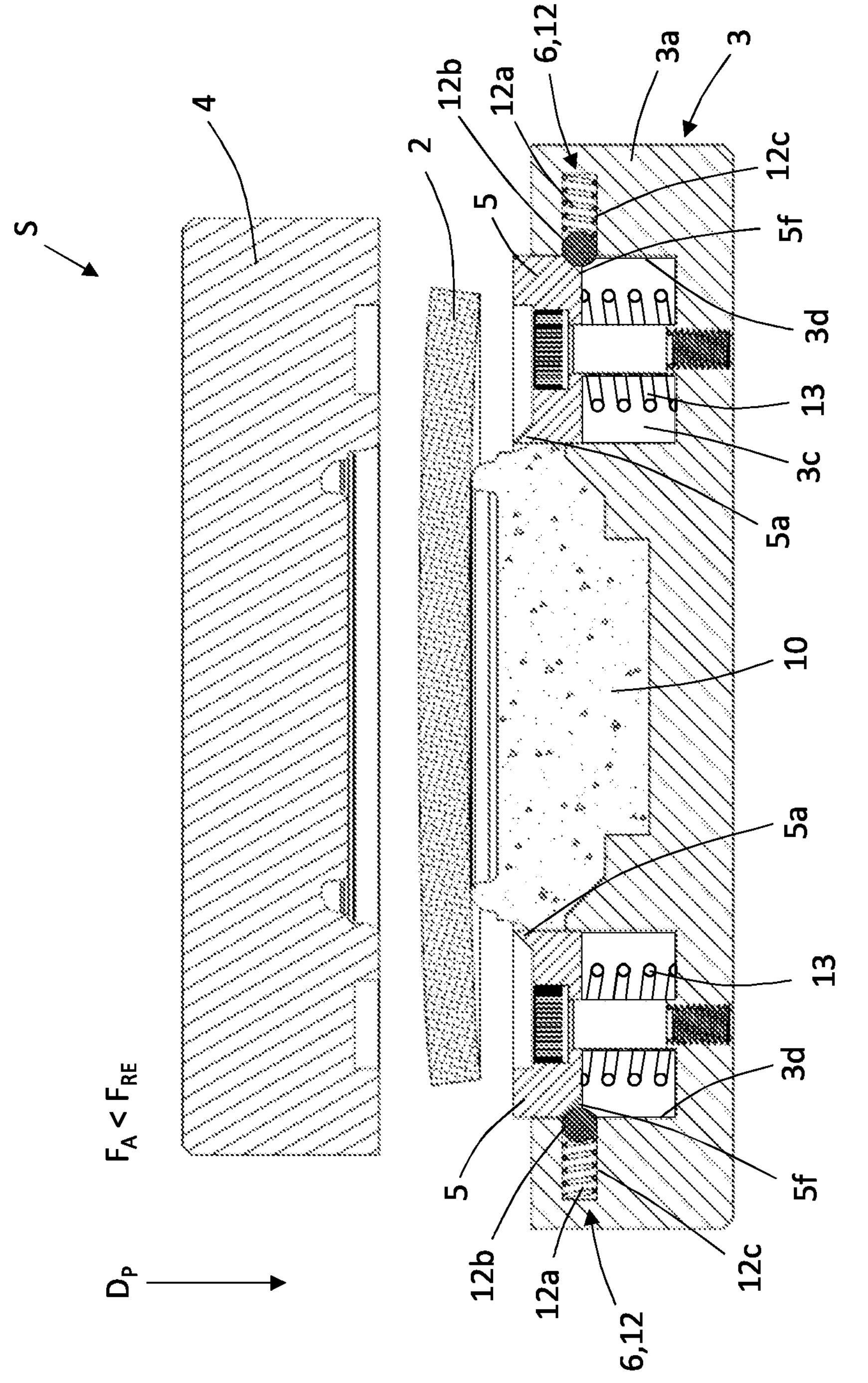
FIG. 7*a-c* show schematically in cross-sectional side views, the forming mould system with the edge-forming device, according to another embodiment of the disclosure.
Figure 7B:
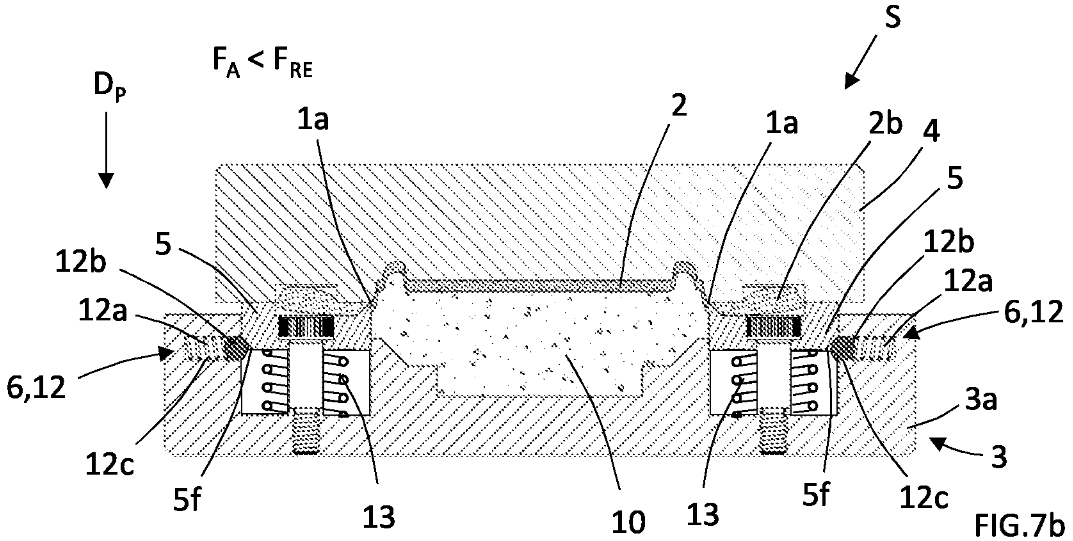
Figure 7C:
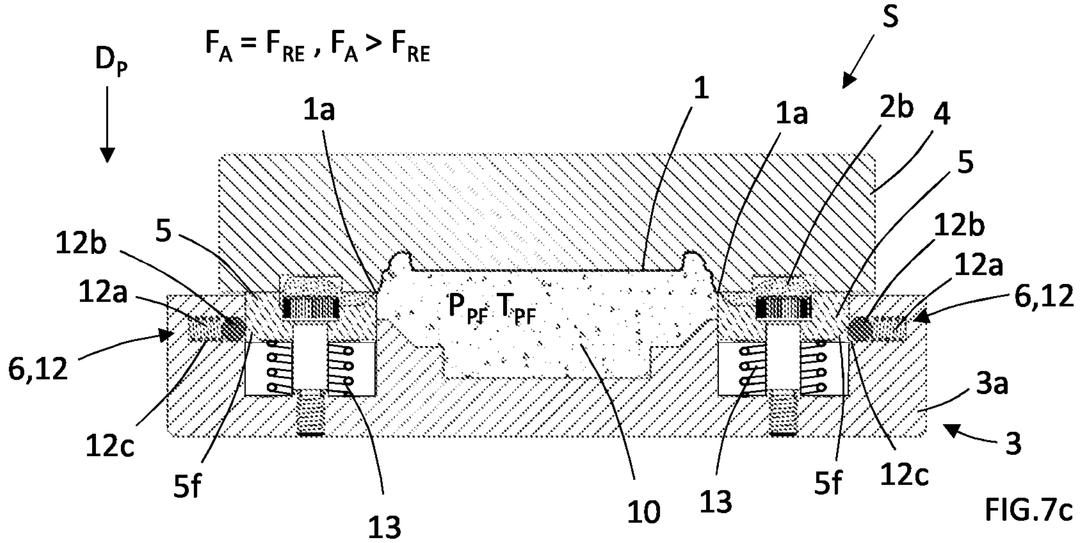

In a further alternative embodiment illustrated in FIGS. 7*a-c*, the pressure member 6 instead comprises one or more detent mechanisms 12 arranged in the recess 3*c* of the base structure 3*a*. The one or more detent mechanisms 12 are arranged for cooperating with the edge-forming device 5. The edge-forming device 5 is configured with a protruding element 5*a* comprising an edge section 5*b*, and has suitably a function and design as described in the embodiment above in connection to FIGS. 2*a-d*.

In the embodiment shown in FIGS. 7*a-c*, the pressure member 6 is arranged with one or more detent mechanisms 12 of the spring-ball type, where each of the one or more detent mechanisms 12 is comprising a spring 12*a* and a detent ball 12*b* arranged in a channel 12*c* or similar structure in connection to an outer side wall 3*d* of the recess 3*c*. The detent ball 12*b* is configured for interacting with an outer side edge 5*f* of the edge-forming device 5. The outer side edge 5*f* has an inclined configuration in the illustrated embodiment, but may have any suitable shape. The pressure member 6 suitably comprises a plurality of detent mechanisms 12 arranged around the recess 3*c* as indicated in FIGS. 7*a-c*.

With this arrangement of the pressure member shown in FIGS. 7*a-c*, the edge-forming device 5 is held in position in the pressing direction $D_P$ by the pressure member 6 until a predetermined release force $F_{RE}$ is applied onto the edge-forming device 5 by the second mould part 4, as shown in FIGS. 7*a-b*, where an applied force $F_A$ is less than the predetermined release force $F_{RE}$. The spring loaded detent balls 12*b* are preventing the edge-forming device 5 to move into the recess 3*c* when the applied force $F_A$ is less than the predetermined release force $F_{RE}$. The predetermined release force $F_{RE}$ is determined by the configurations of the springs 12*a* and the configuration of the outer side edge 5*f*. The springs 12*a* and the outer side edge 5*f* may be varied for different forming applications, and is determined to match a specific desired edge-forming pressure level $P_{EFL}$. The springs 12*a* may be of any suitable type, such as compression springs. As described above, a suitable edge-forming pressure level $P_{EFL}$ is at least 10 MPa, preferably in the range of 10-4000 MPa, or more preferably in the range of 100-4000 MPA, and the edge-forming pressure $P_{EF}$ is established through interaction from the pressure member 6.

The forming mould system S in the embodiment shown in FIGS. 7*a-c* may further comprise a heating unit, in the same way as described in the embodiment above in connection to FIGS. 2*a-d*, where an edge-forming temperature level $T_{EFL}$ in the range of 50-300° C., preferably in the range of 100-300° C., is applied onto the cellulose blank structure 2 with the heating unit.

During the edge-forming operation the first mould part 3 and the second mould part 4 are moved in a direction towards each other, and in the embodiment illustrated in FIGS. 7*a-c*, the second mould part 4 is moved towards the first mould part 3 in a similar way as described in connection to FIGS. 2*a-d*. During the movement of the second mould part 4 towards the first mould part 3, the protruding element 5*a* of the edge-forming device 5 is separating some of the fibres 2*a* of the cellulose blank structure 2 by forces applied to the cellulose blank structure 2 by the protruding element 5*a*, as shown in FIGS. 3*a-b*. The second mould part 4 is moved from a starting position shown in FIG. 7*a* towards the first mould part 3, and when the second mould part 4 is reaching the first mould part 3, as shown in FIG. 7*b*, the stopping member 7 arranged on the first mould part 3 is preventing direct contact between the protruding element 5*a* and the second mould part 4 during forming of the compacted edge structure 1*a*. The stopping member 7 is suitably arranged as a protrusion on the edge-forming device 5, with an extension in the pressing direction $D_P$ that is greater than the extension of the protruding element 5*a*, in a similar way as described in the embodiment above in connection to FIGS. 2*a-d*. When the second mould part 4 is reaching the first mould part 3, the stopping member 7 is interacting with the second mould part 4 and through the greater extension in the pressing direction $D_P$ contact between the protruding element 5*a* and the second mould part 4 is prevented. The stopping member 7 may be arranged as a continuous element extending around the edge-forming device 5, or alternatively as one or more protrusions extending from the edge-forming device 5. The stopping member 7 may instead be arranged on the second mould part 4, or both on the first mould part 3 and the second mould part 4. With this arrangement, the edge-forming operation is taking place with the edge-forming device 5 held in position by the detent mechanisms, as shown in FIG. 7*b*.

Upon further movement of the second mould part 4 towards the first mould part 3, the applied force $F_A$ onto the edge-forming device 5 increases to a level where the applied force $F_A$ is equal to or exceeds the predetermined release force $F_{RE}$. When the applied force $F_A$ is equal to or greater than the predetermined release force $F_{RE}$, the edge-forming device 5 is released by the one or more detent mechanisms 12 and pushed by the second mould part 4 in the pressing direction $D_P$ into the recess 3*c*, as shown in FIG. 7*c*. When being released, the detent balls 12*a* are pushed into their respective channels 12*c* upon compression of the respective springs 12*b*, allowing the edge-forming device 5 to be pushed into the recess 3*c*. Through the releasing of the edge-forming device 5 the available system force can be used in the product forming operation. The forming mould system S may in this embodiment further be provided with one or more return springs 13 for pushing the edge-forming device 5 back to the position illustrated in FIG. 7*a* after the product forming operation shown in FIG. 7*c*.

The one or more detent mechanisms 12 may in an alternative non-illustrated embodiment instead be arranged in connection to an inner side wall of the recess 3*c*, configured for interacting with an inner side edge of the edge-forming device 5. In a further non-illustrated alternative embodiment, the one or more detent mechanism may instead be arranged in connection to both the inner and outer side wall of the recess 3*c*, configured for interacting with the inner and outer side edges of the edge-forming device 5.

Thus, with this system configuration illustrated in FIGS. 7*a-c*, the pressure member 6 with the detent mechanisms 12 has the function of a release system when the predetermined release force $F_{RE}$ is reached or exceeded. The release functionality is allowing the edge-forming operation to take place before the product forming operation, and by releasing the edge-forming pressure $P_{EF}$ when the edge structure 1*a* has been formed more of the total forming mould system pressure available can be used in the following product forming operation step.

Figure 8A:
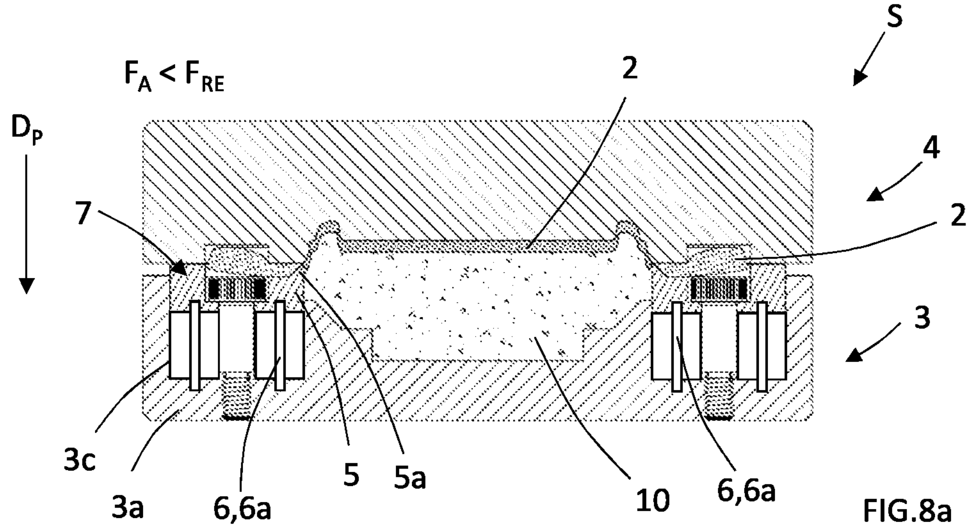
FIG. 8*a-b* show schematically in cross-sectional side views, the forming mould system with the edge-forming device, according to another embodiment of the disclosure.
Figure 8B:
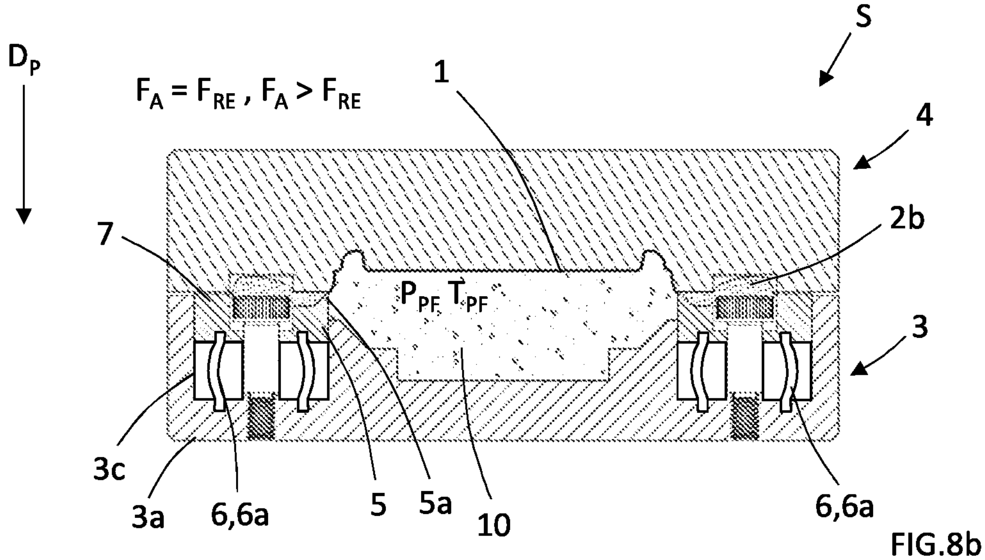

The detent mechanisms 12 may instead be of the plunger-detent type. Instead of detent mechanisms, hydraulic mechanisms, pneumatic mechanisms, or magnetic mechanisms, may be used for holding the edge-forming device in position until the predetermined release force $F_{RE}$ is reached or exceeded. Alternatively, as shown in FIG. 8*a-b*, the pressure member 6 may be configured with leaf springs 6*a* extending in the pressing direction $D_P$ between the edge-forming device 5 and the recess 3*c*. The leaf springs 6*a* will remain straight for loads less than the critical predetermined release force $F_{RE}$, as shown in FIG. 8*a*. With this configuration, the predetermined release force $F_{RE}$ is a critical load corresponding to the lowest applied force $F_A$ that will cause lateral deflection or buckling of the leaf springs 6*a*. Thus, for loads equal to or greater than the predetermined release force $F_{RE}$, the leaf springs 6*a* will deflect laterally and lower the total system force. The leaf springs 6*a* are thus allowed to bend from an initial position shown in FIG. 8*a* to a released position shown in FIG. 8*b* when the predetermined release force $F_{RE}$ is reached or exceeded. In FIG. 8*a* the applied force $F_A$ is less that the predetermined release force $F_{RE}$, and in FIG. 8*b* the released position is shown. Through the releasing of the edge-forming device 5 the available system force can be used in the product forming operation.

Upper and lower are in this context and throughout the disclosure referring to the orientation as illustrated in the figures. It should be understood that components, parts or details may be oriented in other ways if desired.

The forming mould system S may, as indicated above, further comprise a suitable control unit for controlling the forming of the cellulose products 1. The control unit may comprise, suitable software and hardware for controlling the multi-cavity forming mould system S, and the different process and method steps performed by the multi-cavity forming mould system S. The control unit may for example control the temperature, pressure, the forming time, and other process parameters. The control unit may further be connected to related process equipment, such as for example, pressing units, heating units, cellulose blank structure transportation units, and cellulose product transportation units.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of the forming mould system, the one or more programs comprising instructions for performing the method according to any one of the above-discussed embodiments. Alternatively, according to another exemplary embodiment a cloud computing system can be configured to perform any of the method aspects presented herein. The cloud computing system may comprise distributed cloud computing resources that jointly perform the method aspects presented herein under control of one or more computer program products. Moreover, the processor may be connected to one or more communication interfaces and/or sensor interfaces for receiving and/transmitting data with external entities such as e.g. sensors, an off-site server, or a cloud-based server.

The processor or processors associated with the forming mould system may be or include any number of hardware components for conducting data or signal processing or for executing computer code stored in memory. The system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Cellulose product
1*a*: Edge structure
2: Cellulose blank structure
2*a*: Fibres
2*b*: Residual fibres
3: First mould part
3*a*: Base structure
3*b*: Inner forming mould section
3*c*: Recess
3*d*: Side wall
4: Second mould part
4*a*: High pressure surface
5: Edge-forming device
5*a*: Protruding element
5*b*: Edge section 5*c*: Lower surface
5*d*: Sealing element
5*e*: Upper surface
5*f*: Side edge
6: Pressure member
6*a*: Spring
6*b*: Hydraulic pressure unit
6*c*: Pressure chamber
7: Stopping member
8: Heating unit
9: Forming cavity
10: Deformation element
11*a*: Hydraulic pump
11*b*: Accumulator tank
11*c*: Forming pressure valve
11*d*: Pressure control valve
11*e*: Tank
12: Detent mechanism
12*a*: Spring
12*b*: Detent ball
12*c*: Channel
13: Return spring
$D_P$: Pressing direction
$F_A$: Applied force
$F_{RE}$: Predetermined release force
G: Gap
$P_{EF}$: Edge-forming pressure
$P_{EFL}$: Edge-forming pressure level
$P_{PF}$: Product forming pressure
S: Forming mould system
$T_{EF}$: Edge-forming temperature
$T_{EFL}$: Edge-forming temperature level
$T_{PF}$: Product forming temperature
$Z_{HP}$: High pressure zone

The invention claimed is:

1. A method for edge-forming cellulose products in a forming mould system (S), wherein the forming mould system (S) is adapted for forming the cellulose products from an air-formed cellulose blank structure, wherein the forming mould system (S) comprises a first mould part and a second mould part arranged for cooperating with each other, wherein the first mould part comprises an edge-forming device with a protruding element configured for compacting and separating fibres of the cellulose blank structure, wherein the edge-forming device is movably arranged in relation to a base structure of the first mould part, wherein the edge-forming device is adapted for interacting with a pressure member arranged in the base structure, wherein the method comprises the steps:

providing the air-formed cellulose blank structure, and arranging the cellulose blank structure between the first mould part and the second mould part;

forming a compacted edge structure of the cellulose products by separating fibres of the cellulose blank structure with the protruding element, applying an edge-forming temperature ($T_{EF}$) onto the cellulose blank structure, and compacting the cellulose blank structure by applying an edge-forming pressure ($P_{EF}$) by means of the pressure member onto the cellulose blank structure between the protruding element and the second mould part.

2. The edge-forming method according to claim 1, wherein the forming mould system (S) comprises a heating unit, wherein the method further comprises the steps: applying an edge-forming temperature level ($T_{EFL}$) in the range of 50-300° C., preferably in the range of 100-300° C., onto the cellulose blank structure with the heating unit, and applying an edge-forming pressure level ($P_{EFL}$) of at least 10 MPa, preferably in the range of 10-4000 MPa, or more preferably in the range of 100-4000 MPa, onto the cellulose blank structure with the pressure member.

3. The edge-forming method according to claim 1, wherein the method further comprises the steps: applying the edge-forming temperature ($T_{EF}$) onto the cellulose blank structure with the protruding element and/or the second mould part.

4. The edge-forming method according to claim 1, wherein the forming mould system (S) comprises a stopping member arranged on the first mould part and/or the second mould part, wherein the method further comprises the step: preventing contact between the protruding element and the second mould part with the stopping member during forming of the compacted edge structure.

5. The edge-forming method according to claim 1, wherein the method further comprises the steps: establishing the edge-forming pressure ($P_{EF}$) onto the cellulose blank structure upon movement of the edge-forming device in relation to the base structure through interaction from the pressure member.

6. The edge-forming method according to claim 1, wherein the pressure member comprises one or more springs arranged between the base structure and the edge-forming device, wherein the one or more springs are establishing the edge-forming pressure ($P_{EF}$) onto the cellulose blank structure between the protruding element and the second mould part.

7. The edge-forming method according to claim 1, wherein the pressure member comprises a hydraulic pressure unit, wherein the hydraulic pressure unit comprises a pressure chamber arranged between the base structure and the edge-forming device, wherein the hydraulic pressure unit is establishing the edge-forming pressure ($P_{EF}$) onto the cellulose blank structure between the protruding element and the second mould part.

8. The edge-forming method according to claim 1, wherein the pressure member comprises one or more detent mechanisms arranged in the base structure, wherein the one or more detent mechanisms are configured for interacting with the edge-forming device for establishing the edge-forming pressure ($P_{EF}$) onto the cellulose blank structure between the protruding element and the second mould part, wherein the method further comprises the steps: exerting an applied force ($F_A$) onto the edge-forming device by the second mould part; and releasing the one or more detent mechanisms when the applied force ($F_A$) is equal to or greater that a predetermined release force ($F_{RE}$) for allowing movement of the edge-forming device in relation to the base structure.

9. A forming mould system (S) for forming edges of cellulose products, wherein the forming mould system (S) is adapted for forming the cellulose products from an air-formed cellulose blank structure, wherein the forming mould system (S) comprises a first mould part and a second mould part arranged for cooperating with each other, characterized in that the first mould part comprises an edge-forming device with a protruding element configured for compacting and separating fibres of the cellulose blank structure, wherein the edge-forming device is movably arranged in relation to a base structure of the first mould part, wherein the edge-forming device is adapted for interacting with a pressure member arranged in the base structure, wherein the forming mould system (S) is configured for forming a compacted edge structure of the cellulose products by separating fibres of the cellulose blank structure with the protruding element, applying an edge-forming temperature ($T_{EF}$) onto the cellulose blank structure, and compacting the cellulose blank structure by applying an edge-forming pressure ($P_{EF}$) by means of the pressure member onto the cellulose blank structure between the protruding element and the second mould part.

10. The forming mould system (S) according to claim 9, characterized in that the forming mould system (S) further comprises a heating unit, wherein the heating unit is configured for applying an edge-forming temperature level ($T_{EFL}$) in the range of 50-300° C., preferably in the range of 100-300° C., onto the cellulose blank structure, and wherein the pressure member is configured for applying an edge-forming pressure level ($P_{EFL}$) of at least 10 MPa, preferably in the range of 10-4000 MPa, or more preferably in the range of 100-4000 MPa, onto the cellulose blank structure.

11. The forming mould system (S) according to claim 10, characterized in that the heating unit is configured for applying the edge-forming temperature ($T_{EF}$) onto the cellulose blank structure via the protruding element and/or the second mould part.

12. The forming mould system (S) according to claim 9, characterized in that the forming mould system (S) comprises a stopping member arranged on the first mould part and/or the second mould part, wherein the stopping member is configured for preventing contact between the protruding element and the second mould part during forming of the compacted edge structure.

13. The forming mould system (S) according to claim 9, characterized in that the protruding element comprises an edge section facing the second mould part, wherein the edge section together with the second mould part are configured to form a high pressure zone ($Z_{HP}$) in the cellulose blank structure between the protruding element and the second mould part during forming of the compacted edge structure.

14. The forming mould system (S) according to claim 13, characterized in that the second mould part comprises a high pressure surface facing the edge section, wherein the high pressure surface together with the protruding element are configured to form the high pressure zone ($Z_{HP}$) during forming of the compacted edge structure.

15. The forming mould system (S) according to claim 9, characterized in that the forming mould system (S) is configured for establishing the edge-forming pressure ($P_{EF}$) upon movement of the edge-forming device in relation to the base structure through interaction from the pressure member.

16. The forming mould system (S) according to claim 9, characterized in that the pressure member comprises one or more springs arranged between the base structure and the edge-forming device.

17. The forming mould system (S) according to claim 9, characterized in that the pressure member comprises a hydraulic pressure unit, wherein the hydraulic pressure unit comprises a pressure chamber arranged between the base structure and the edge-forming device.

18. The forming mould system (S) according to claim 9, characterized in that the pressure member comprises one or more detent mechanisms arranged in the base structure, wherein the one or more detent mechanisms are configured for interacting with the edge-forming device.

19. The forming mould system (S) according to claim 9, characterized in that the base structure comprises an inner forming mould section, wherein the edge-forming device is extending around the inner forming mould section.

* * * * *